No. 818,193. PATENTED APR. 17, 1906.
J. REICHERT.
HARNESS SNAP HOOK DEVICE.
APPLICATION FILED FEB. 28, 1905.
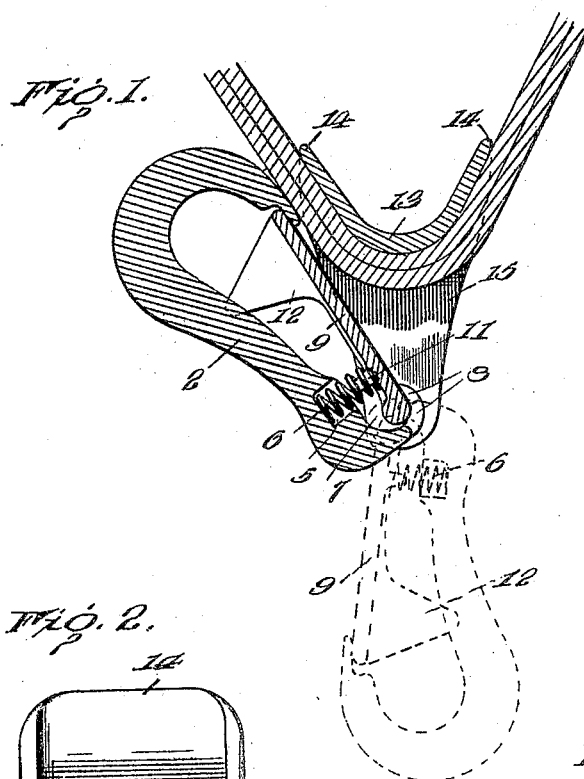
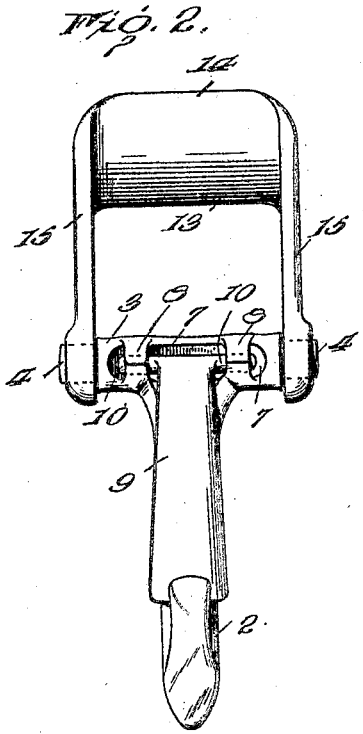
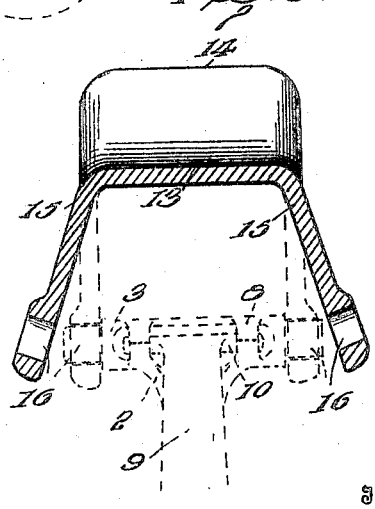
Witnesses
Inventor
John Reichert
By
Attorney

UNITED STATES PATENT OFFICE.

JOHN REICHERT, OF RACINE, WISCONSIN.

HARNESS SNAP-HOOK DEVICE.

No. 818,193.

Specification of Letters Patent.

Patented April 17, 1906.

Application filed February 28, 1905. Serial No. 247,697.

*To all whom it may concern:*

Be it known that I, JOHN REICHERT, a citizen of the United States, residing at Racine, Racine county, Wisconsin, have invented certain new and useful Improvements in Harness Snap-Hook Devices; and I do hereby declare the following to be a full, clear, and exact description of the invention, such as will enable others skilled in the art to which it appertains to make and use the same.

This invention relates to certain improvements in snap-hook devices for use in connecting various parts of harness.

An object of the invention is to so form the snap-hook and a strap-receiving saddle or spreader pivotally joined to the snap-hook that the excessive swing or movement of the parts will not cause the spring-tongue of the snap to be opened and permit accidental release of the ring or eye therein, or, in other words, to so arrange the parts that the spring-tongue will be guarded against accidental opening when the snap-hook swings to its full limit and into engagement with the strap seated against and spread by said strap-receiving saddle or seat.

Another object of the invention is to provide certain improvements in details in construction and arrangements of parts whereby wear on the straps will be reduced to a minimum and the straps will be so spread as to prevent too rapid lateral movement or throw of the hook and strap-receiving saddle and yet so as to permit such movement as may be necessary for the proper adjustment of the parts.

The invention consists in certain novel features in construction and arrangements and combinations of parts, as more fully and particularly set forth and described hereinafter.

Referring to the accompanying drawings, Figure 1 is a vertical sectional view showing the straps passed under and seated against the strap-receiving saddle or slide, the hook shown swung up to its limit in one direction, dotted lines showing the hook in its normal depending position. Fig. 2 is a front elevation. Fig. 3 is a detail vertical sectional view of the strap-receiving saddle or slide, showing the formation of the same before being applied to the snap-hook, dotted lines showing the upper portion of the snap-hook and the positions of the arms of the saddle or slide when applied thereto.

In the drawings, 2 is the shank or body of the snap-hook, which is shown formed integral with a top cross-bar or straight transverse head 3, having end pintles or journals 4. The shank near its upper end is usually enlarged and formed with a spring-receiving seat or socket 5, opening through the inner face of the shank and receiving the coiled tongue actuating expansive spring 6. The cross-head 3 is cast or otherwise formed with a recess 7 and with two pairs of small lugs or ears 8.

The spring-actuated tongue 9 is formed with trunnions or pintles 10, projecting laterally from its upper end. The upper end of said tongue extends into the recess 7, and the pintles 10 are journaled in said recess and are confined therein by bending down the lugs or ears 8. The tongue laps under the free end or bill of the hook and is held outwardly yieldingly against the under surface of the bill of the hook, closing the hook by the spring 6 bearing against the inner face of the tongue and fitted around a centering-stud 11, rigid with the tongue. The tongue is shown provided with two guards or ears 12, depending from its free end on opposite sides of the hook-shank.

The spring-held tongue is formed without outward projections or is straight or flat from end to end or is otherwise so formed with respect to the hook-bill and the strap-receiving saddle or slide that the hook can swing to its limit in either direction without bringing the tongue into engagement with any part liable to depress the same, and thereby open the hook to the accidental release of the ring or eye of the neck-yoke or other part. The arrangement is such that when the hook swings upwardly to its limit the straps or saddle will not be brought into depressing engagement with the tongue, but so that the outer surface of the hook-bill will act as a guard for the tongue and will engage the straps or the saddle and protect the tongue against direct forcible engagement.

The strap-receiving saddle or slide and spreader is cast or otherwise formed in one piece and is U-shaped and absolutely without parts or portions beneath or which can engage the under or outer surface of the breast or other straps seated on the saddle. This slide consists of the elongated rounded top plate or saddle portion 13, which is extended upwardly and outwardly to form the flaring or diverging ends, terminating at the top in straight transverse rounded end edges 14. This top plate forms an elongated flaring smooth bearing-surface for the strap and is so formed as to spread the straps and prevent too free movement of the saddle or slide on the strap, yet so as to permit such limited steady or comparatively sliding movement on the strap as may be necessary to relieve strain. The saddle or slide is formed as shown to prevent the objectionable sudden blows and throwing or jerking motion which occur where a roller alone is used, which sudden throwing movements injure the straps and other parts and cause objectionable jerks and blows.

The saddle is cast or otherwise formed with the depending side guide plates or arms 15, which are comparatively long and are formed diverging, as shown in Fig. 3, and have transverse journal-openings 16 at their lower ends to loosely receive the pintle ends of the cross-head of the snap-hook.

The saddle or slide and the snap-hook are pivotally joined together or are assembled by placing the snap cross-head between the diverging arms 15, which are then bent toward each other and into parallelism to confine the arms 15 loosely on the cross-head ends.

The arms 15 are comparatively long to throw the snap the desired distance below the straps and bring the snap-bill in proper relation with respect to the top plate of the saddle and to afford considerable space for the free vertical movement of the straps or of the saddle without injurious rubbing or engagement of the straps with the snap cross-head.

The saddle or slide and the attached snap are subjected to great strain and sudden blows and throwing movement by the exceedingly forceful powerful jerking and throw of the tongue or pole when traveling over rough roads, and hence the saddle or slide is forcibly projected from side to side and against the straps. It hence becomes very necessary to so form the slide or saddle as to reduce this throw so far as possible and to avoid injury to and wear on the straps. Any projections or portions of the slide at the outer or under face of the strap present edges which cut into and wear the strap during such throwing movement of the parts and also so tie or bind the slide or saddle to the straps as to cause the strap to throw or jerk with the slide or saddle. I avoid these objections and difficulties by my peculiar formation of the slide or saddle which is absolutely open and free below the straps and presents no cross-bars or projections to engage the under or outer surface of the strap, and yet is so formed as to avoid the objections incidental to the use of the single roller-snap form of slide.

As hereinbefore stated, the slide consists solely of the depending ears or arms 15 and the rounded non-slotted or imperforate slide and spreader-plate 13, which has the upwardly-elongated diverging portions terminating in the upper transverse edges, and hence said plate will not rock or tilt on the breast-straps and cut into and damage said straps, as is the case where the breast-straps are threaded through slots or perforations in the plate and with cross bars or portions extending across the outer faces of the straps. Such cross-bars at the outer faces of the strap often cause the strap to wedge or lock to the plate, and hence when the heavy vehicle-tongue jerks back and forth the straps are cut and damaged and the necks of the draft-animals are cut or otherwise injured. On the other hand and as hereinbefore described, I so form my spreader and slide-plate as to properly fit and spread the breast-straps and have the necessary free movement, and yet so as not to have the free play permitted where the breast-strap merely passes under a roller or round cross-bar and allows the vehicle-tongue to strike the animals and jerk the harness and cause sore necks. It is also because of the forcible jerking throw and movement to which the slide and snap are subjected when in use that it is desirable to provide means or arrangements, as hereinbefore set forth, to prevent engagement and depression of the snap-tongues and consequent accidental release of the rings or eyes therein, as so often happens with the devices now in general use.

I do not wish to limit myself to the exact arrangement shown for pivotally connecting the snap and saddle or slide to provide the long space between the snap and top plate of the saddle, as the saddle side pieces or arms and the snap cross-head might be otherwise formed.

What I claim is—

1. A combined snap and breast-strap slide consisting in the combination of a breast-strap-receiving slide or saddle, and a freely-swinging snap-hook at its upper end pivotally joined thereto, said hook comprising a transverse bar arranged a considerable distance below said slide, a hook-bill and a spring-actuated swinging tongue for and normally closing said hook-bill, said bill forming a guard for said tongue against engagement thereof with the saddle or a breast-strap thereon, said hook-bill, tongue and slide being relatively arranged to hold a breast-strap and said slide from the path of movement of said tongue during the swinging movements of said hook, for the purposes described.

2. In combination, a breast-strap-receiving slide or saddle consisting solely of the curved imperforate spreader and slide-plate having upwardly-diverging portions terminating in the top transverse edges and having the depending side arms, said slide being entirely open and disconnected at the outer sides of and below said plate, and a freely-swinging hook comprising a cross-head between and loosely joined to said arms, a hook-bill, and a swinging spring-actuated tongue for said bill, said tongue being approximately straight, said bill forming a guard or stop for said tongue and against opening engagement between said tongue and said slide or a breast-strap thereon, as and for the purposes described.

3. A combined snap and breast-strap slide comprising, in combination, a breast-strap-receiving saddle, and a freely-swinging snap-hook at its upper end having a transverse head pivotally joined to the saddle, said hook comprising said head arranged a considerable distance below said saddle, a hook-bill and an approximately straight tongue, said snap-hook being so pivoted to the saddle that when the bill of the hook strikes the breast-strap no portion of the strap on the saddle will intersect the plane passed through the hook-bill and the pivotal line between the snap-hook and the saddle, whereby said bill forms a guard for said tongue.

4. A combined snap and slide comprising a saddle consisting of a curved plate terminating in upwardly-extending ends and having side walls, and a freely-swinging snap-hook having a transverse portion pivotally joined to said side walls, said hook having a yieldingly-held tongue and a guard for said tongue consisting of the hook-bill arranged with respect to the tongue and saddle to prevent opening engagement between said tongue and any portion of a harness connection passing under said saddle-plate, said saddle being open and unobstructed opposite said plate ends, whereby said plate rests freely and loosely on said connection and is free to rock and move vertically and independently thereof the distance between said plate and said snap-hook transverse portion, substantially as described.

In testimony whereof I affix my signature in presence of two witnesses.

JOHN REICHERT.

Witnesses:
   H. L. YANCE,
   PAULINE ERICHSEN.